United States Patent
Dodke et al.

(10) Patent No.: US 10,079,835 B1
(45) Date of Patent: Sep. 18, 2018

(54) SYSTEMS AND METHODS FOR DATA LOSS PREVENTION OF UNIDENTIFIABLE AND UNSUPPORTED OBJECT TYPES

(71) Applicant: Symantec Corporation, Mountain View (CA)

(72) Inventors: Dhananjay Dodke, Pune (IN); Sumesh Jaiswal, Pune (IN); Amit Dhotre, Kuwarbav Ratnagiri (IN); Vipul Goel, Uttar Pradesh (IN)

(73) Assignee: Symantec Corporation, Mountain View, CA (US)

( * ) Notice: Subject to any disclaimer, the term of this patent is extended or adjusted under 35 U.S.C. 154(b) by 311 days.

(21) Appl. No.: 14/868,344

(22) Filed: Sep. 28, 2015

(51) Int. Cl.
*H04L 29/06* (2006.01)
*G06F 21/10* (2013.01)

(52) U.S. Cl.
CPC ........ *H04L 63/105* (2013.01); *H04L 63/1416* (2013.01); *G06F 21/10* (2013.01); *H04L 29/06578* (2013.01); *H04L 63/0254* (2013.01); *H04L 63/20* (2013.01)

(58) Field of Classification Search
CPC . H04L 63/0227; H04L 63/0254; H04L 63/20; H04L 63/105; H04L 63/1416; H04L 29/06578; H04L 29/06986; G06F 21/10
USPC .......................................................... 726/1
See application file for complete search history.

(56) References Cited

U.S. PATENT DOCUMENTS

| | | | | |
|---|---|---|---|---|
| 8,127,360 B1* | 2/2012 | Wilhelm | ............... | G06F 21/552 726/25 |
| 8,161,522 B1* | 4/2012 | Agrawal | ............. | G06F 21/6245 707/736 |
| 8,391,543 B1* | 3/2013 | Verma | ................... | G06F 21/556 283/113 |
| 8,429,745 B1* | 4/2013 | Casaburi | ............... | G06F 21/554 726/1 |
| 8,549,643 B1* | 10/2013 | Shou | ..................... | G06F 21/556 455/410 |
| 8,677,448 B1* | 3/2014 | Kauffman | ......... | G06F 17/30082 726/1 |
| 8,726,396 B1* | 5/2014 | Dodke | .................. | G06F 21/552 726/1 |

(Continued)

OTHER PUBLICATIONS

"Websense", http://www.websense.com/content/home.aspx, as accessed Aug. 6, 2015, (Oct. 24, 2008).

*Primary Examiner* — Izunna Okeke
*Assistant Examiner* — Shahriar Zarrineh
(74) *Attorney, Agent, or Firm* — FisherBroyles, LLP

(57) ABSTRACT

A computer-implemented method for data loss prevention of unidentifiable and unsupported object types may include (1) monitoring, through at least one filter, data input to an application during execution, (2) scanning, through a data loss prevention scanner, the data input to the application to detect whether the data includes sensitive data that is protected by a data loss prevention policy, (3) flagging, based on the scanning, the application as having accessed the sensitive data that is protected by the data loss prevention policy, (4) detecting that the application is requesting to output a data object in a format that obscures underlying content, and (5) performing, by a data loss prevention program, a remedial action to prevent loss of the sensitive data based on both flagging the application and detecting that the application is requesting to output the data object in the format that obscures underlying content.

20 Claims, 7 Drawing Sheets

(56) References Cited

U.S. PATENT DOCUMENTS

| | | | |
|---|---|---|---|
| 8,950,005 B1* | 2/2015 | Torney | G06F 21/629 713/193 |
| 9,064,130 B1* | 6/2015 | Asheghian | G06F 21/6281 |
| 9,094,130 B2* | 7/2015 | Bliss | H04B 10/541 |
| 9,294,507 B1* | 3/2016 | Roth | H04L 63/20 |
| 2003/0182246 A1* | 9/2003 | Johnson | G06N 7/08 705/76 |
| 2005/0229258 A1* | 10/2005 | Pigin | G06F 21/6209 726/27 |
| 2007/0078896 A1* | 4/2007 | Hayashi | G06F 17/30038 |
| 2009/0254971 A1* | 10/2009 | Herz | G06Q 10/10 726/1 |
| 2010/0162347 A1* | 6/2010 | Barile | G06F 21/552 726/1 |
| 2010/0191602 A1* | 7/2010 | Mikkelsen | G06Q 20/322 705/14.64 |
| 2011/0083190 A1* | 4/2011 | Brown | G06F 21/6209 726/26 |
| 2011/0113466 A1* | 5/2011 | Stringham | G06F 17/30864 726/1 |
| 2011/0219434 A1* | 9/2011 | Betz | G06F 21/00 726/5 |
| 2011/0239306 A1* | 9/2011 | Avni | G06F 21/54 726/26 |
| 2012/0150773 A1* | 6/2012 | DiCorpo | G06N 99/005 706/12 |
| 2012/0303558 A1* | 11/2012 | Jaiswal | G06N 99/005 706/12 |
| 2013/0061284 A1* | 3/2013 | Berengoltz | G06F 21/51 726/1 |
| 2013/0268994 A1* | 10/2013 | Cooper | H04L 63/10 726/1 |
| 2014/0007246 A1* | 1/2014 | Nelson | H04L 63/12 726/26 |
| 2014/0189784 A1* | 7/2014 | Marino | G06F 21/60 726/1 |
| 2014/0194094 A1* | 7/2014 | Ahuja | H04W 4/021 455/410 |
| 2015/0006390 A1* | 1/2015 | Aissi | G06Q 20/40 705/44 |
| 2015/0026464 A1* | 1/2015 | Hanner, Sr. | H04L 63/0245 713/168 |
| 2015/0356303 A1* | 12/2015 | Plastina | G06F 21/60 726/28 |
| 2016/0065617 A1* | 3/2016 | Das | G06F 17/30345 726/1 |
| 2016/0080397 A1* | 3/2016 | Bacastow | H04L 63/1408 726/1 |
| 2016/0080399 A1* | 3/2016 | Harris | H04L 63/1416 726/23 |
| 2016/0110732 A1* | 4/2016 | Dravneek | G06Q 30/0201 726/1 |
| 2016/0117495 A1* | 4/2016 | Li | G06O 10/103 726/1 |
| 2016/0212133 A1* | 7/2016 | Chenard | H04L 63/10 |
| 2016/0277368 A1* | 9/2016 | Narayanaswamy | G06F 21/6218 |
| 2016/0283746 A1* | 9/2016 | Boshoff | H04N 1/32149 |
| 2017/0063883 A1* | 3/2017 | Franzoni Martinez | H04L 63/1416 |
| 2017/0086717 A1* | 3/2017 | Boock | A61B 5/14532 |

* cited by examiner

SYSTEMS AND METHODS FOR DATA LOSS PREVENTION OF UNIDENTIFIABLE AND UNSUPPORTED OBJECT TYPES

BACKGROUND

Individuals and organizations often possess sensitive information that they wish to protect from leaking to the outside world. Accordingly, these individuals and organizations may employ one or more systems to ensure that the sensitive information is maintained as a private secret. For example, enterprise organizations typically encrypt private communications between their own members. Similarly, enterprise organizations may request that their employees contractually promise to maintain the secrecy and confidentiality of internal work product and intellectual property.

Instead of relying on legal, ad hoc, or manual methods for protecting the secrecy of sensitive information, enterprise corporations increasingly employ comprehensive data loss prevention systems. These systems may monitor activities on corporate computing systems and network environments to detect and prevent the loss of sensitive information. For example, data loss prevention systems may scan the textual content of a file or document, detect the presence of sensitive information, and then perform an action to prevent the loss or leaking of the sensitive information. Nevertheless, traditional systems for preventing data loss may fail to perform optimally along one or more dimensions, as discussed further below. Accordingly, the instant disclosure identifies and addresses a need for additional and improved systems and methods for data loss prevention of unidentifiable and unsupported object types.

SUMMARY

As will be described in greater detail below, the instant disclosure generally relates to systems and methods for data loss prevention of unidentifiable and unsupported object types by, for example, detecting whether an application has accessed sensitive data or not and then blocking or tagging write requests that the application issues after having accessed sensitive data. The disclosed systems and methods may thereby overcome deficiencies of other systems that could not scan or parse data objects in certain formats, such as image files, as discussed further below.

In one example, a computer-implemented method for data loss prevention may include (1) monitoring, through at least one filter, data input to an application during execution, (2) scanning, through a data loss prevention scanner, the data input to the application to detect whether the data includes sensitive data that is protected by a data loss prevention policy, (3) flagging, based on the scanning, the application as having accessed the sensitive data that is protected by the data loss prevention policy, (4) detecting, after flagging the application, that the application is requesting to output a data object in a format that obscures underlying content such that the data loss prevention scanner is prevented from scanning the data object to determine whether the underlying content includes the sensitive data, and (5) performing, by a data loss prevention program, a remedial action to prevent loss of the sensitive data based on both flagging the application and detecting that the application is requesting to output the data object in the format that obscures underlying content. The remedial action may include (A) blocking the request to output the data object and/or (B) tagging the data object with a tag that designates that the data object was created after the sensitive data was input to the application.

In one embodiment, the filter may include a network filter that filters network packets received by the application during execution. In another embodiment, the filter may include a file system filter that filters file access requests from the application to a file system. In a further embodiment, the filter may include an operating system clipboard filter that filters data pasted into the application during execution. In an additional embodiment, the filter may include an application inter-process communication share filter that filters data received into the application from other applications.

In some examples, scanning the data may include (1) identifying textual content within the data input to the application during execution and (2) scanning the textual content for at least one of strings and patterns defined as protected by the data loss prevention policy. In a further embodiment, the format that obscures underlying content may include an image format. The image format may enable an image to leak sensitive data by displaying text without the text being computer-readable as a string.

In some examples, detecting that the application is requesting to output the data object in the format that obscures underlying content may include detecting that the data object has a file signature that specifies the format of the data object. In one embodiment, the application remains flagged during execution as having accessed the sensitive data until a process corresponding to the application is terminated.

In another embodiment, flagging, based on the scanning, the application as having accessed the sensitive data that is protected by the data loss prevention policy may include (1) determining that the application has accessed a quantity of sensitive data and (2) determining that the quantity of sensitive data is greater than a threshold amount that defines a threshold beyond which the application is flagged.

In one embodiment, the application requests to output the data object in the format that obscures underlying content by (1) requesting to transmit the data object in an outbound network packet, (2) issuing a write request to a file system to write the data object to the file system, (3) performing at least one of a cut command and a copy command to copy the data object to an operating system clipboard that makes the data object available to other applications, and/or (4) sharing the data object with an operating system inter-process sharing module that makes the data object available to other applications.

In one embodiment, a system for implementing the above-described method may include (1) a monitoring module, stored in memory, that monitors, through at least one filter, data input to an application during execution, (2) a scanning module, stored in memory, that scans, through a data loss prevention scanner, the data input to the application to detect whether the data includes sensitive data that is protected by a data loss prevention policy, (3) a flagging module, stored in memory, that flags, based on the scanning, the application as having accessed the sensitive data that is protected by the data loss prevention policy, (4) a detection module, stored in memory, that detects, after flagging the application, that the application is requesting to output a data object in a format that obscures underlying content such that the data loss prevention scanner is prevented from scanning the data object to determine whether the underlying content includes the sensitive data, and (5) a performance module, stored in memory, that performs, as part of a data loss prevention program, a remedial action to prevent loss of the sensitive data based on both flagging the application and detecting that the application is requesting to output the data object in the format that obscures underlying content. The remedial action may include (A) blocking the request to output the data object and/or (B) tagging the data object with a tag that designates that the data object was created after the sensitive data was input to the application. The system may also include at least one physical processor configured to execute the monitoring module, the scanning module, the flagging module, the detection module, and/or the performance module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) monitor, through at least one filter, data input to an application during execution, (2) scan, through a data loss prevention scanner, the data input to the application to detect whether the data includes sensitive data that is protected by a data loss prevention policy, (3) flag, based on the scanning, the application as having accessed the sensitive data that is protected by the data loss prevention policy, (4) detect, after flagging the application, that the application is requesting to output a data object in a format that obscures underlying content such that the data loss prevention scanner is prevented from scanning the data object to determine whether the underlying content includes the sensitive data, and (5) perform, by a data loss prevention program, a remedial action to prevent loss of the sensitive data based on both flagging the application and detecting that the application is requesting to output the data object in the format that obscures underlying content. The remedial action may include (A) blocking the request to output the data object and/or (B) tagging the data object with a tag that designates that the data object was created after the sensitive data was input to the application.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
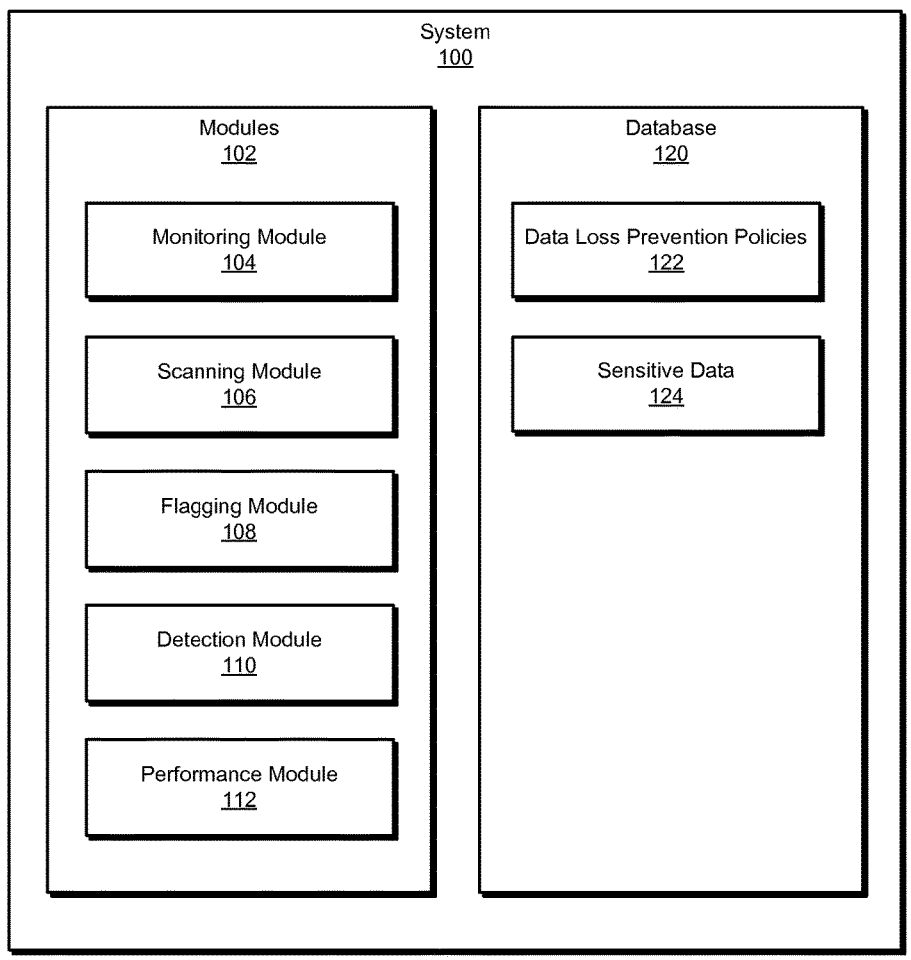
FIG. 1 is a block diagram of an exemplary system for data loss prevention of unidentifiable and unsupported object types.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for data loss prevention of unidentifiable and unsupported object types. As will be explained in greater detail below, the systems and methods disclosed herein may overcome limitations of other data loss prevention systems that failed to prevent the leaking of sensitive data through one or more file formats, or data object formats, that the systems could not scan or parse. For example, image files may display text and yet traditional data loss prevention systems may have failed to parse the text within the images, because the text was not encoded in a computer readable format as a string. Moreover, in some examples, performing optical character recognition to parse the text may be overly burdensome and inefficient, especially if most images do not include text, much less sensitive data. To overcome these and other problems, the disclosed systems and methods may monitor whether applications access sensitive data and then flag those applications that do access sensitive data.

Once an application is flagged, the disclosed systems may further monitor the application to determine whether the application attempts to output a file or other data object that the systems are unable to scan or parse, as discussed above. If the application does attempt to output the data object in a format that the systems cannot scan or parse, then the systems may block the write request, tag the data object, or otherwise perform a remedial action, as discussed further below. In other words, once the application is flagged as having accessed sensitive data, then the systems may simply prevent all attempts to write files or data objects in formats that the data loss prevention systems cannot read, because the systems will be unable to trust that the files do not include the sensitive data in a computer-unreadable format. The systems may thereby ensure that the sensitive data remains with the application rather than being leaked.

Figure 2:
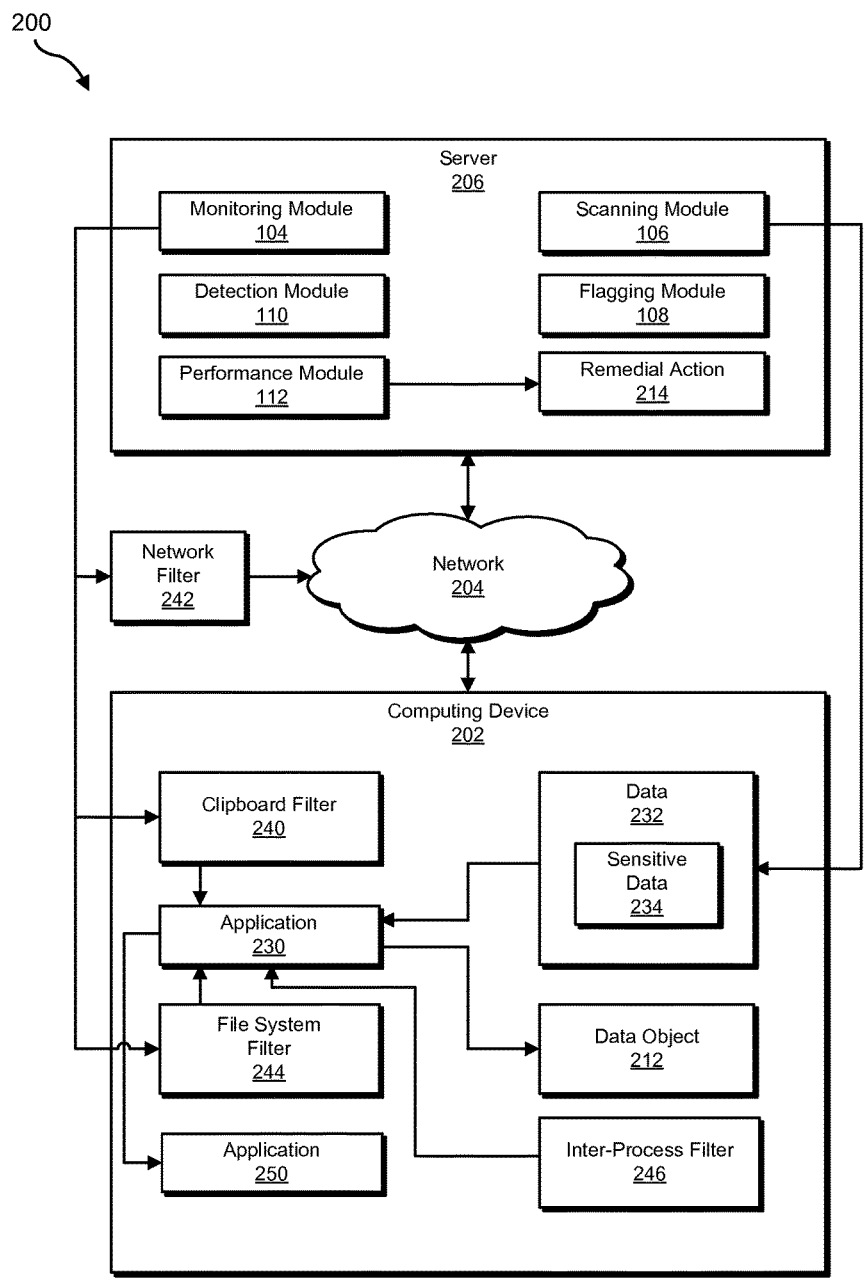
FIG. 2 is a block diagram of an additional exemplary system for data loss prevention of unidentifiable and unsupported object types.

The following will provide, with reference to FIGS. 1-2, detailed descriptions of exemplary systems for data loss prevention of unidentifiable and unsupported object types. Detailed descriptions of corresponding computer-implemented methods will also be provided in connection with FIGS. 3-5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for data loss prevention. As illustrated in this figure, exemplary system 100 may include one or more modules 102 for performing one or more tasks. For example, and as will be explained in greater detail below, exemplary system 100 may also include a monitoring module 104 that may monitor, through at least one filter, data input to an application during execution. Exemplary system 100 may additionally include a scanning module 106 that may scan, through a data loss prevention scanner, the data input to the application to detect whether the data includes sensitive data that is protected by a data loss prevention policy. Exemplary system 100 may also include a flagging module 108 that may flag, based on the scanning, the application as having accessed the sensitive data that is protected by the data loss prevention policy.

Exemplary system 100 may additionally include a detection module 110 that may detect that the application is requesting to output a data object in a format that obscures underlying content such that the data loss prevention scanner is prevented from scanning the data object to determine whether the underlying content includes the sensitive data. Exemplary system 100 may also include a performance module 112 that may perform, as part of a data loss prevention program, a remedial action to prevent loss of the sensitive data based on both flagging the application and detecting that the application is requesting to output the data object in the format that obscures underlying content. The remedial action may include blocking the request to output the data object and/or tagging the data object with a tag that designates that the data object was created after the sensitive data was input to the application. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store data loss prevention policies 122, which may correspond to policies that specify which data is defined as sensitive data that should be prevented from leaking and/or specify how to prevent the sensitive data from leaking. As used herein, the term "policy" generally refers to any specification of one or more rules or procedures for preventing data loss, as discussed further below. Database 120 may also be configured to store sensitive data 124. As used herein, the term "sensitive data" generally refers to data that is defined as protected according to one or more data loss prevention policies. In other words, upon detecting one or more actions that may potentially leak sensitive data, the data loss prevention system may be triggered to take one or more actions in response to prevent the potential leak.

Database 120 may represent portions of a single database or computing device or a plurality of databases or computing devices. For example, database 120 may represent a portion of server 206 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as server 206 in FIG. 2, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of computing device 202 and/or server 206, enable computing device 202 and/or server 206 to prevent data loss. For example, and as will be described in greater detail below, monitoring module 104 may monitor, through at least one filter (such as a network filter 242, a clipboard filter 240, inter-process filter 246, and/or a file system filter 244), data 232 input to an application 230 during execution. Scanning module 106 may scan, through a data loss prevention scanner, data 232 input to application 230 to detect whether data 232 includes sensitive data 234 that is protected by a data loss prevention policy. Flagging module 108 may flag, based on the scanning, application 230 as having accessed sensitive data 234 that is protected by the data loss prevention policy. Detection module 110 may detect, after flagging module 108 flags application 230, that application 230 is requesting to output a data object 212 in a format that obscures underlying content such that the data loss prevention scanner is prevented from scanning data object 212 to determine whether the underlying content includes sensitive data 234. Performance module 112 may perform, as part of a data loss prevention program, a remedial action 214 to prevent loss of sensitive data 234 based on both flagging application 230 and detecting that application 230 is requesting to output data object 212 in the format that obscures underlying content. System 200 may also include an application 250 that may correspond to a target application receiving data object 212 from application 230 as a source application.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Server 206 generally represents any type or form of computing device that is capable of facilitating data loss prevention or functioning as a data loss prevention system. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206.

In the example of FIG. 2, modules 102 are located server-side on server 206. Nevertheless, in other embodiments, some or all of the modules may be located in computing device 202 or another device, such as a proxy device. Accordingly, some or all of the modules may be located within computing device 202 and/or server 206 according to any permutation.

Figure 3:
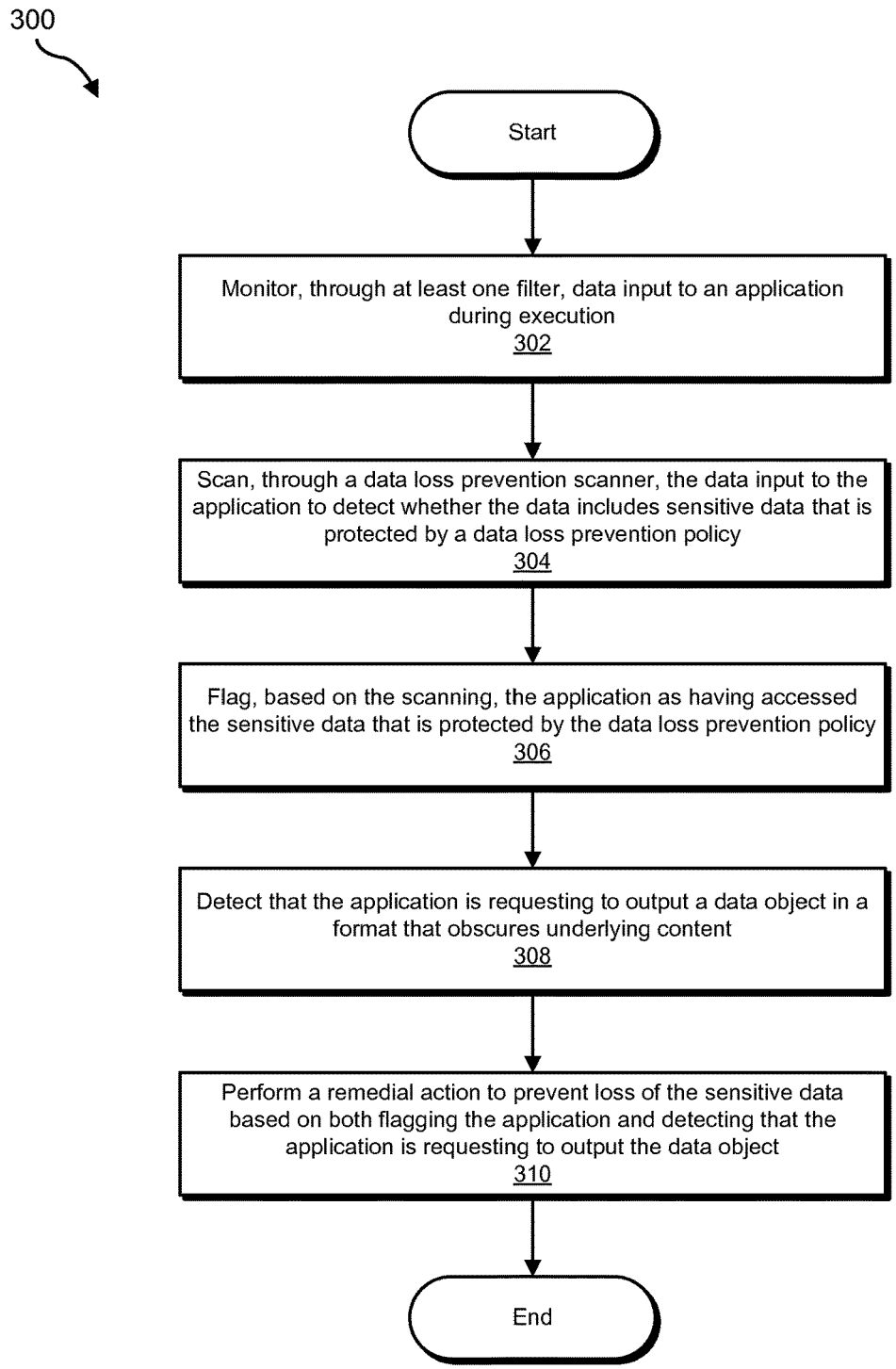
FIG. 3 is a flow diagram of an exemplary method for data loss prevention of unidentifiable and unsupported object types.

FIG. 3 is a flow diagram of an exemplary computer-implemented method 300 for data loss prevention of unidentifiable and unsupported object types. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302, one or more of the systems described herein may monitor, through at least one filter, data input to an application during execution. For example, monitoring module 104 may, as part of server 206 in FIG. 2, monitor, through one or more filters, data 232 input to application 230 during execution. As used herein, the phrase "monitor" generally refers to any action that identifies data input to the application to enable the data to be scanned for data loss prevention, as discussed further below. Moreover, as used herein, the term "filter" generally refers to a component that identifies, isolates, extracts, and/or analyzes data directed to a destination (e.g., a file system, network packet, operating system clipboard, and/or inter-process communication module) without necessarily preventing the data from reaching that destination.

Monitoring module 104 may monitor data input to the application in a variety of ways. For example, monitoring module 104 may monitor data input to the application through one or more of (1) network filter 242 that filters network packets received by the application during execution, (2) file system filter 244 that filters file access requests from the application to a file system, (3) operating system clipboard filter 240 that filters data pasted into the application during execution, and (4) inter-process 246 filter that filters data received into the application from other applications. Network filter 242 may monitor metadata and/or network packet payloads (e.g., underlying content) for sensitive data. File system filter 244 may monitor file access requests (e.g., read, write, copy, delete, and/or create commands, etc.) for sensitive data. Similarly, clipboard filter 240 may monitor cut commands, copy commands, and/or paste commands for sensitive data. Additionally, inter-process filter 246 may correspond to an inter-process communication filter. Inter-process filter 246 may monitor data objects transmitted between applications through an operating system inter-process communication sharing or transmission mechanism. Monitoring module 104 may also monitor user input or peripheral device input, such as keyboard, mouse, voice or Dictaphone, still camera, video camera, web-cam, and/or other input for scanning by scanning module 106.

In general, these data loss prevention filters may monitor data by first obtaining an entire body of data to be scanned. For example, network filter 242 may obtain one or more network packets and extract metadata, header information, payload information, and/or underlying content from the network packets. Similarly, file system filter 244 may obtain files and/or content stored within the files corresponding to one or more file access requests, as outlined above. Additionally, network filter 242 may obtain one or more data objects (e.g., strings of text, images, multimedia clips, HTML segments, and/or other data structure instances) that have been cut, copied, and/or pasted using an operating system clipboard or other clipboard for sharing data between applications. Furthermore, inter-process filter 246 may filter data received from other applications through an operating system inter-process communication module, as discussed above. In some embodiments, the data loss prevention filters may transmit identified sensitive data to a data application radar, which may maintain a record of correspondence between applications, application identifiers, one or more items of sensitive data accessed by the respective applications, and/or status identifiers indicating whether the respective applications have accessed sensitive data.

In some embodiments, these filters may constitute data loss prevention filters that are configured to monitor text as distinct from monitoring images, sound, video, and/or other non-text multimedia. Moreover, as discussed further below, text-based filters may be unable to prevent the loss of sensitive data (i.e., sensitive textual content) through non-text multimedia that includes the sensitive data in a format that prevents the filters from reading the sensitive data from the non-text multimedia without modifying the non-text multimedia, performing optical character recognition scanning, or otherwise transforming the non-text multimedia. For example, an audio clip, video clip, and/or image may output text (e.g., lyrics in a song) in a manner that the data loss prevention scanners cannot directly read as a string or set of characters. In other words, instead of encoding the text as characters, such as ASCII, the multimedia file may indirectly encode the text in terms of pixels and/or sound waves.

In some examples, the data loss prevention filters may monitor the data input by collecting, aggregating, and/or pooling some or all of the data coming across the filter over a specified period of time. For example, the data loss prevention filters may collect all of the network packets, all of the files targeted by file access requests, and/or all of the data objects accessed through the clipboard filter over a specified period. In further examples, the specified period of time may begin at the same time that the application begins execution. In other words, the specified period of time may begin when a process is initiated within the operating system to load data for the application into memory and then execute the application through the process. In general, the monitoring may continue along as the application is executing prior to termination. Additionally or alternatively, the data loss prevention filters may simply identify, extract, and/or analyze one or more pages or other segments of memory that are dedicated or assigned to the process for storing data input to the application or otherwise stored by the application during execution (i.e., the data loss prevention filters may identify the data after it reaches the application rather than prior to the data reaching the application).

In some embodiments, the data loss prevention filters may hook into the application to catch some or all of the data input to the application through the network, file system, and/or the clipboard. In an additional example, a real time application monitoring driver (and/or file system filter 244) may intercept attempts to initiate execution of the application and then hook the application such that data input to the application is first intercepted by one or more of the data loss prevention filters.

In some examples, the data loss prevention filters may monitor and scan the data input to the application on a dynamic and real-time basis continuously as the data is input to the application. In other examples, the data loss prevention filters may perform one or more of the collecting and the scanning at predefined intervals, according to a predefined schedule, and/or in response to detecting an attempt by the application to output a data object (e.g., a non-text multimedia data object that may potentially leak sensitive textual data, as outlined above). For example, in some embodiments, the data loss prevention filters may only scan the data upon detecting that the application is attempting to output the data object, thereby preventing the needless scanning of the data in cases where the application is executed and terminated without ever attempting to output such a data object. Notably, the data loss prevention filters may be integrated with monitoring module 104 or, instead, may constitute separate modules that simply communicate with monitoring module 104.

At step 304, one or more of the systems described herein may scan, through a data loss prevention scanner, the data input to the application to detect whether the data includes sensitive data that is protected by a data loss prevention policy. For example, scanning module 106 may, as part of server 206 in FIG. 2, scan, through the data loss prevention scanner, the data input to the application to detect whether the data includes sensitive data that is protected by a data loss prevention policy. As used herein, the term "data loss prevention scanner" generally refers to any hardware or software module that scans data to identify sensitive data that is protected by a data loss prevention policy, as discussed further below.

Scanning module 106 may scan the data input to the application in a variety of ways. Notably, scanning module 106, the data loss prevention scanner, and/or the data loss prevention filters may all correspond to the same module or instead refer to one or more separate modules that simply communicate with each other. Moreover, prior to scanning the data input to the application, scanning module 106 and/or monitoring module 104 may extract underlying content from the data (e.g., through a text extractor). For example, scanning module 106 may distinguish between metadata, formatting data, and data specifying how content is presented, on the one hand, and underlying content or text, on the other hand. In some examples, scanning module 106 may discard some or all of the metadata and formatting data while leaving the underlying data for scanning for sensitive data. In other examples, scanning module 106 may scan the metadata as well.

Notably, as used herein, use of the text extractor to extract text from document files and other files does not indicate that those document files "obfuscate" the presence of underlying textual content, as discussed further below for step 308. In other words, the text extractor simply extracts text that is already present within the file (e.g., the document file) whereas text that is displayed within a multimedia file, such as an image file, is not present within the file when displayed in ASCII or text formatting. Instead, the underlying text displayed within the media file is simply encoded in terms of pixels, sound waves, etc., as discussed further below.

In some examples, scanning module 106 may scan the data in part by identifying textual content within the data input to the application during execution. Moreover, scanning module 106 may then scan the textual content for at least one of strings and patterns defined as protected by the data loss prevention policy.

After monitoring module 104 obtains the entire body of data to be scanned, scanning module 106 may scan the data for sensitive data. For example, the data loss prevention filters may search all or some of the body of data for instances of specific items of sensitive data. Specific items of sensitive data refer to specific values (as distinct from patterns that may encompass ranges of values) that have been blacklisted to prevent the loss of the specific items of sensitive data. For example, specific items of sensitive data may refer to specific phone numbers, specific addresses, specific bank account information, specific personally identifying information, corporate intellectual property, and/or any other specific values or items of information that a data loss prevention system may be configured to protect.

Additionally or alternatively, scanning module 106 may also search all or some of the body of data for instances of data that match one or more predefined patterns that have been blacklisted to prevent the loss of sensitive data. For example, the data loss prevention filters may scan the body of data for any numbers or strings that satisfy the pattern for a telephone number, any numbers or strings that satisfy the pattern for an address, any numbers that satisfy the pattern for a credit card number, etc.

At step 306, one or more of the systems described herein may flag, based on the scanning, the application as having accessed the sensitive data that is protected by the data loss prevention policy. For example, flagging module 108 may, as part of server 206 in FIG. 2, flag, based on the scanning, application 230 as having accessed sensitive data 234 that is protected by the data loss prevention policy.

As used herein, the phrase "flag" generally refers to any action that triggers a data loss prevention system to prevent or obstruct an attempt by the flagged application to output a data object that may potentially contain sensitive data in an obfuscated format, as discussed further below (or otherwise perform a remedial action to prevent the loss of data). Moreover, as used herein, the term "sensitive data" generally refers to any data that a data loss prevention system protects to prevent loss or leakage. Typical examples of sensitive data may include personal or corporate identifying information, medical information, academic information, intellectual property, and/or any other similar sensitive data that an individual or organization may seek to prevent from loss or leakage.

Flagging module 108 may flag the application in a variety of ways. In some examples, flagging module 108 may flag the application by setting at least one bit to indicate that the application is flagged. In further examples, flagging module 108 may switch a data loss prevention system from a state of permitting the application to output one or more data objects to a state of not permitting the application to output the one or more data objects (e.g., data objects formatted in the format that potentially obfuscates underlying textual content). In additional examples, flagging module 108 may simply increase or enhance a barrier, obstacle, or difficulty to overcome in order for the application to output the data object.

In general, flagging module 108 may flag the application to indicate a switch from a state in which the application has not accessed any sensitive data and, therefore, can be trusted to not output any sensitive data because that would be impossible (i.e., the application cannot output sensitive data that the application has never accessed or possessed) to a state in which the application has accessed at least some sensitive data and, therefore, the application cannot be trusted such that any unreadable or obfuscated data object that the application outputs may potentially contain the sensitive data in an obfuscated format. In other words, the disclosed systems and methods herein may assume that any obfuscated data object output by an application in a state in which the application has previously accessed sensitive data is untrusted and/or contains the sensitive data and, therefore, should be blocked (or some other remedial action should be performed).

In some examples, flagging module 108 may flag application 230 by determining that the application has accessed a quantity of sensitive data. Moreover, flagging module 108 may also then determine that the quantity of sensitive data is greater than a threshold amount that defines a threshold beyond which the application is flagged. For example, the threshold may specify that the detection of any sensitive data may trigger the flagging of the application. In other words, a single hit that matches a single item of data that the application accessed to a single item of data that the data loss prevention system blacklists to protect from loss may trigger the flagging of the application (i.e., a single credit card number match). Alternatively, the threshold amount may define a larger amount of sensitive data beyond which the application is flagged, thereby providing the application with some tolerance and preventing an overly strict application of the data loss prevention policy. For example, flagging module 108 may require two, three, four, five, 10, 20, 50, 100, or any other arbitrary amount of sensitive data (e.g. in terms of hits) to be detected before flagging the application as having accessed sensitive data.

In performing these calculations, flagging module 108 may also weight some sensitive data more heavily than other sensitive data such that a single hit on a more sensitive item of data may increase a running total closer to the threshold more than a single hit on a less sensitive item of data. In these examples, flagging module 108 and/or system 200 as a whole may specify both which items of data constitutes sensitive data that is protected by the data loss prevention system and also specific values or formulas that define weights for one or more of these items of sensitive data. Flagging module 108 may also base the determination of whether to flag the application on a rate of accessing sensitive data over a unit of time (e.g., a duration of time, acceleration, jerk, or other n-order measurement), such as by measuring the rate, acceleration, or jerk against a corresponding threshold.

In one embodiment, the application remains flagged during execution as having accessed the sensitive data until a process corresponding to the application is terminated. In other words, termination of the application may guarantee that the ability of the application to access sensitive data no longer exists such that the application may be trusted again. In other examples, the application may remain flagged until the clearing, blocking, deleting, overwriting, and/or invalidating of one or more areas, units, and/or pages of memory that the application accessed, to which the application possessed access, and/or to which the application wrote the sensitive data. In these examples, the ability of the application to access the sensitive data may expire without the process corresponding to the application also expiring, because the memory location where the sensitive data was stored or accessible has been deleted or otherwise made inaccessible.

Figure 4:
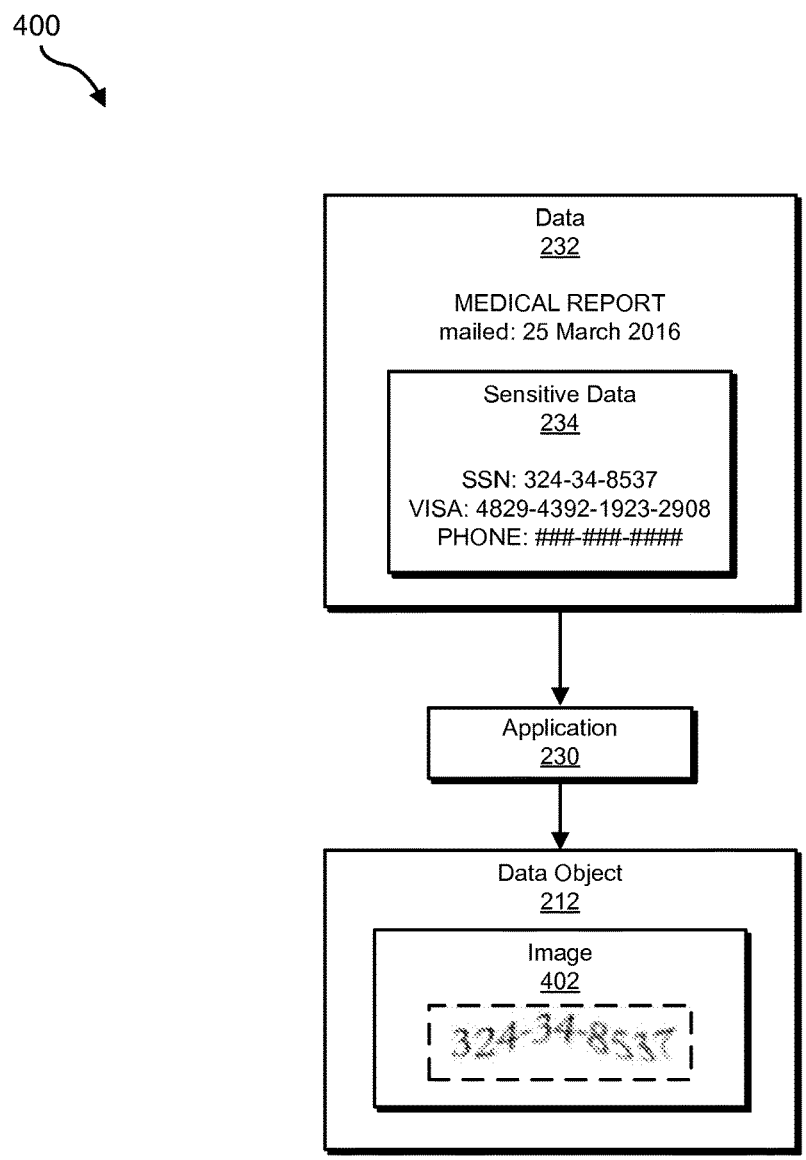
FIG. 4 is a block diagram of exemplary sensitive data input to an application and a corresponding data object that the application attempts to output.

FIG. 4 illustrates an example of data 232, application 230, and a data object 212. In the example of FIG. 4, data 232 may refer to a medical report, which was mailed on 25 Mar. 2016. As further shown in this figure, data 232 may also include sensitive data 234, which may further include a Social Security number, a credit card (e.g., VISA) number, and a telephone number. The arrow from data 232 to application 230 indicates that monitoring module 104 may monitor the data that application 230 accesses, attempts to access, and/or has authorization or ability to access. In this example, monitoring module 104 may monitor application 230 and thereby detect that application 230 has accessed data 232. Moreover, scanning module 106 may scan data 232 and then detect that data 232 includes sensitive data 234, as further outlined above. In view of the above, flagging module 108 may flag application 230 as having accessed sensitive data. For example, flagging module 108 may determine that the amount of sensitive data accessed by application 230 is greater than the predefined threshold (which may be zero or some other nonzero amount of arbitrary size), as outlined above.

At step 308 in FIG. 3, one or more of the systems described herein may detect, after flagging the application, that the application is requesting to output a data object in a format that obscures underlying content such that the data loss prevention scanner is prevented from scanning the data object to determine whether the underlying content includes the sensitive data. For example, detection module 110 may, as part of server 206 in FIG. 2, detect, after flagging application 230, that application 230 is requesting to output data object 212 in a format that obscures underlying content such that scanning module 106 is prevented from scanning data 232 to determine whether the underlying content includes sensitive data 234.

As used herein, the term "data object" generally refers to any unit of data or data structure instance that an application may attempt to output, such as by transmitting the data object through a network packet, writing the data object to a file system, and/or cutting or copying the data object to an operating system clipboard. Moreover, as used herein, the phrase "obscuring underlying content such that the data loss prevention scanner is prevented from scanning the data object" generally refers to the data object embedding underlying content within a multimedia format such that extracting the sensitive data, by the data loss prevention system, requires additional processing (e.g., optical character recognition processing) beyond the processing required to simply output or display the multimedia data object. In one embodiment, the sensitive data refers to textual or character-encoded data and the data object is formatted in a multimedia format, such as a picture, audio clip, or video clip, that embeds the character-encoded data within the data object in a manner that the data loss prevention system cannot directly read in the same manner that it would directly read textual content from a document file. Notably, in some examples, the data object may be embedded within a larger file (e.g., a video data object may be embedded within a larger slide presentation file).

In some examples, the format that obscures underlying content may include an image format. The image format may enable an image to leak sensitive data by displaying text without the text being computer-readable as a string. In the example of FIG. 4, application 230 may attempt to output data object 212, which may include an image 402 that displays sensitive data (e.g., a Social Security number) in an obfuscated manner. In this example, image 402 may display the number in a warped or CAPTCHA-style format that constitutes a barrier to optical character recognition of the image. In other examples, image 402 may display the sensitive data in a straight and uniform, or non-warped, manner that nevertheless requires optical character recognition or other analysis to extract the sensitive information as distinct from directly reading the string of text in the same manner that applications read strings of text from document files. In other words, image 402 may encode the sensitive data indirectly by encoding the sensitive data as pixels, sound waves, or other multimedia attributes as distinct from encoding the sensitive data directly in terms of character codes or text strings (e.g., ASCII characters). In other examples, an encrypted format may also enable the data object or corresponding document to leak sensitive data by preventing a data loss prevention system from detecting the sensitive data due to encryption.

Detection module 110 may detect that the application is attempting to output the data object in a variety of ways. In general, detection module 110 may detect that the application is attempting to output the data object in a manner parallel to the manners in which monitoring module 104 and scanning module 106 monitored and scanned the application for sensitive data (e.g., performing essentially the same function to monitor application outputs instead of application inputs). For example, detection module 110 may hook the application (e.g., through a file system and/or operating system driver) to intercept attempts by the application to output data objects through one or more channels, such as the network, the file system, and/or the operating system clipboard. Accordingly, detection module 110 may include, or interface with, one or more of clipboard filter 240, file system filter 244, and network filter 242, as first discussed above.

Just as scanning module 106 may scan data input to the application for sensitive data, detection module 110 may scan or detect data output by the application for a format that the data loss prevention scanner cannot read or parse (e.g., cannot directly read or parse, as discussed above). Examples of these formats may include image formats, sound formats, video formats, unsupported formats (e.g., new and/or customize formats, including file formats), and/or encrypted formats. Accordingly, detection module 110 may intercept some or all attempts by the application to output data objects and then determine whether the data objects that the application attempts to output are formatted in a format that potentially obfuscates underlying sensitive data. In some examples, detection module 110 may specify or predefine a list of readable or non-obfuscated formats and/or a list of unreadable or obfuscated formats. Detection module 110 may then detect whether the data object is formatted in an obfuscated format by checking for the presence or absence of the data object format on one or both of the lists.

In some examples, detection module 110 may conclude that the format is unreadable and obfuscated based on a determination that the format is not included within the list of readable formats, even if the format is also not included within the list of unreadable formats (e.g., in the case that the format refers to a new, customized, unsupported, and/or encrypted format). In further examples, detection module 110 may detect that the application is requesting to output the data object in the format that obscures underlying content by detecting that the data object has a file signature that specifies the format (e.g., a file signature that corresponds to a file signature for a format that is not included in the list or set of readable formats and/or is included within the list or set of unreadable formats). In some examples, the file signature may include a file extension (e.g., ".JPG").

In general, in response to detecting that the application is attempting to output the data object, detection module 110 may request the status of the application from the application data radar, as discussed above (i.e., the flag or other indication of whether the application has accessed sensitive data). Performance module 112 may then perform a remedial action in response to a determination that the application was flagged, as discussed further below.

At step 310, one or more of the systems described herein may perform, through a data loss prevention program, a remedial action to prevent loss of the sensitive data based on both flagging the application and detecting that the application is requesting to output the data object in the format that obscures underlying content. For example, performance module 112 may, as part of server 206 in FIG. 2, perform, as part of system 200, a remedial action to prevent loss of sensitive data 234 based on both flagging application 230 and detecting that application 230 is requesting to output data object 212 in the format that obscures underlying content. As used herein, the term "remedial action" generally refers to any action that a data loss prevention system may perform to protect sensitive data from loss or leakage.

Performance module 112 may perform the remedial action in a variety of ways. In some examples, performance module 112 may simply block the attempt to output the data object. In these examples, the remedial action may prevent the data object from being received at the corresponding network, file system, and/or operating system clipboard. In further examples, the remedial action may include notifying the application about the blocking of the data object and/or the reason for blocking the data object. In other examples, the remedial action may simply fail the attempt to output the data object without notifying or explaining to the application.

In additional examples, the remedial action may simply create an obstacle or barrier in order for the application to output the data object. For example, performance module 112 may prompt a user or administrator for approval or override to output the data object. In other examples, the remedial action may simply audit the output of the data object or otherwise record the output of the data object.

Figure 5:
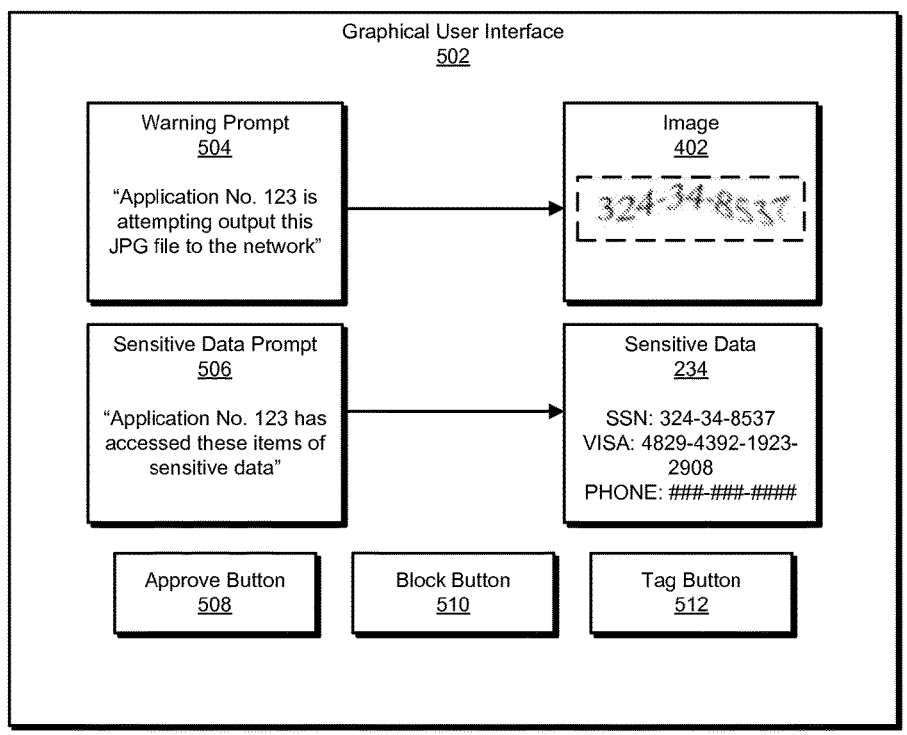
FIG. 5 is a block diagram of an exemplary graphical user interface.

FIG. 5 shows an exemplary graphical user interface 502 that may include a warning prompt 504 and/or a sensitive data prompt 506. As further shown in this figure, warning prompt 504 may warn a user that a specified application is attempting to output a data object in an unreadable or obfuscated format (in this example, a .JPG format). Additionally or alternatively, graphical user interface 502 may also display image 402 and/or sensitive data 234 for the convenience and reference of the user. Notably, a human user may immediately perceive that image 402 includes an item of sensitive data (i.e., the Social Security number 324-34-8537) that was also accessed by the application, as further shown in sensitive data 234 within graphical user interface 502. Accordingly, graphical user interface 502 may enable a user to readily ascertain whether the output of the data object should be permitted. Moreover, graphical user interface 502 may also enable a user to distinguish between textual data within the image or multimedia object that corresponds to sensitive data 234 accessed by the application and other textual data that does not correspond to sensitive data 234. In other words, the presence of sensitive data 234 within graphical user interface 502 may enable the user to more quickly and conveniently determine whether any textual content within the multimedia data object constitutes sensitive data protected by the data loss prevention policy.

As further shown in FIG. 5, graphical user interface 502 may also include an approve button 508, a block button 510, and a tag button 512. Approve button 508 and block button 510 may correspond to approving the attempt to output the data object and blocking the attempt to output the data object, as discussed further above. In other examples, performance module 112 may perform the remedial action by simply tagging the data object, which may correspond to tag button 512. In these examples, performance module 112 may tag the data object by fixing a tag, marker, watermark, header, and/or metadata item that one or more data loss prevention filters or scanners may read, thereby converting the data object from an unreadable format to a readable format. The tag may indicate that the data object was created at a time that the application had accessed, or had access to, sensitive data. The tag may also specify all or some of the sensitive data that the application accessed, thereby enabling data loss prevention filters to perform more granular filtering at one or more other positions or layers of the computing environment protected by the data loss prevention systems (e.g., more sensitive data may be blocked at one or more additional locations or layers than less sensitive data). In alternative examples, the user may be given an option, prompt, and/or instruction to remove the sensitive data, after which the attempt to output the revised data object without the sensitive data included may be permitted.

In general, performance module 112 may tag the data object and then allow the data object to be written to the file system, network, and/or operating system clipboard, after which the data object may be prevented from leaking outside of a corresponding organization or enterprise at a further or different layer of filters, interceptors, and/or checkpoints (which may reference the tag to determine that the data object should not be permitted to be transmitted outside of the organization). Similarly, in some examples the application may write or transmit the data object to another application. In these examples, the new target application, such as application 250, may inherit the classification of the source application, such as application 230 (i.e., if the source application was flagged as having accessed sensitive data then the target application receiving the data object may be flagged too in a parallel manner).

In further examples, the attempt to output the data object may trigger one or more attempts to convert the data object from the obfuscated format to a computer-readable format, such as by performing optical character recognition. Upon performing optical character recognition, the data loss prevention system may then proceed as if the underlying text had been extracted from a conventional document file. In other examples, detecting the presence of sensitive data within a multimedia or obfuscated format may trigger or indicate a notification that a user potentially intended to circumvent the data loss prevention system and leak sensitive data.

As explained above in connection with method 300 in FIG. 3, the systems and methods disclosed herein may overcome deficiencies of other data loss prevention systems that failed to prevent the leaking of sensitive data through one or more file formats, or data object formats, that the systems could not scan or parse. For example, image files may display text and yet traditional data loss prevention systems may have failed to parse the text within the images, because the text was not encoded in a computer readable format as a string. Moreover, in some examples, performing optical character recognition to parse the text may be overly burdensome and inefficient, especially if most images do not include text, much less sensitive data. To overcome these and other problems, the disclosed systems and methods may monitor whether applications access sensitive data and then flag those applications that do access sensitive data.

Figure 6:
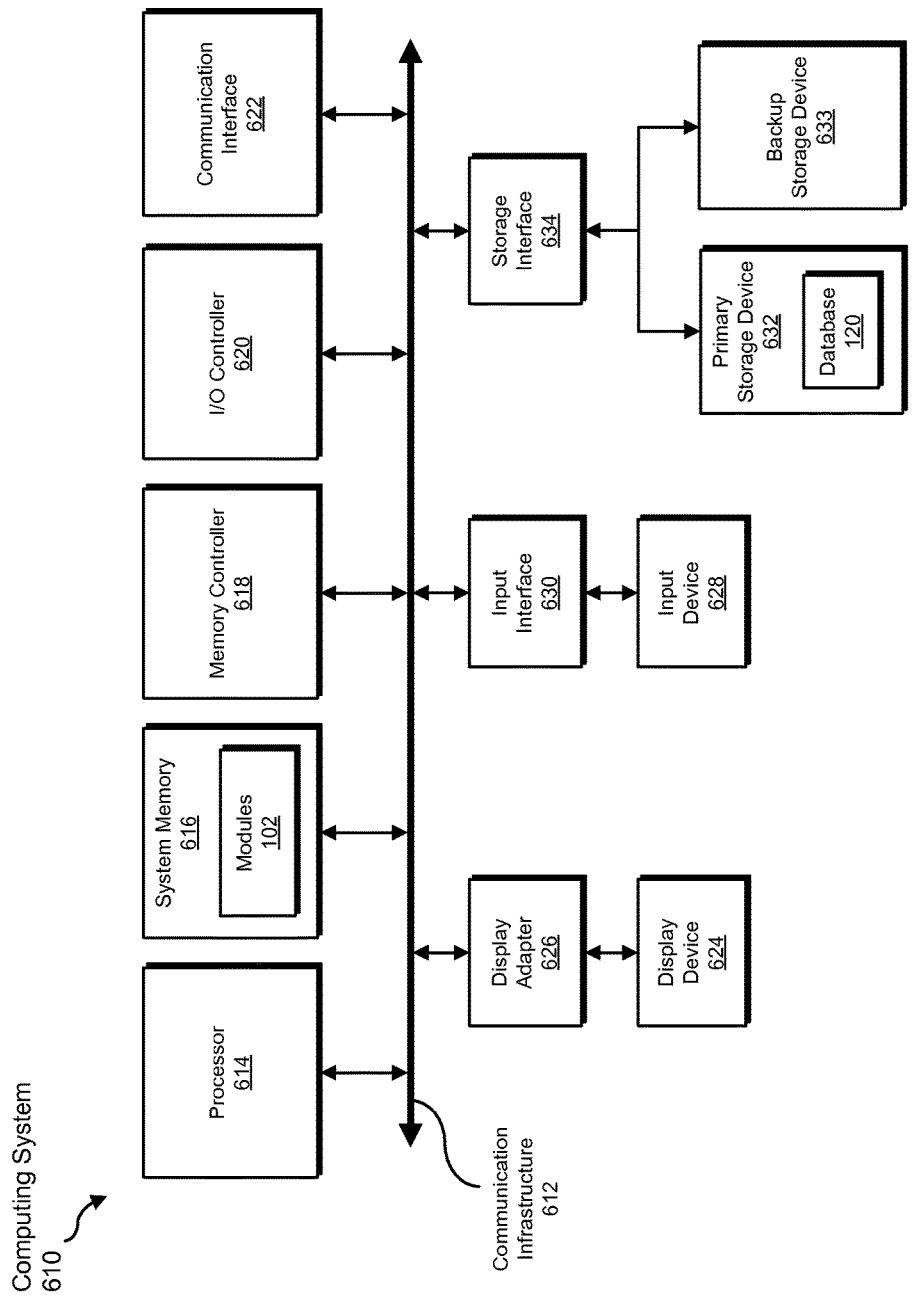
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
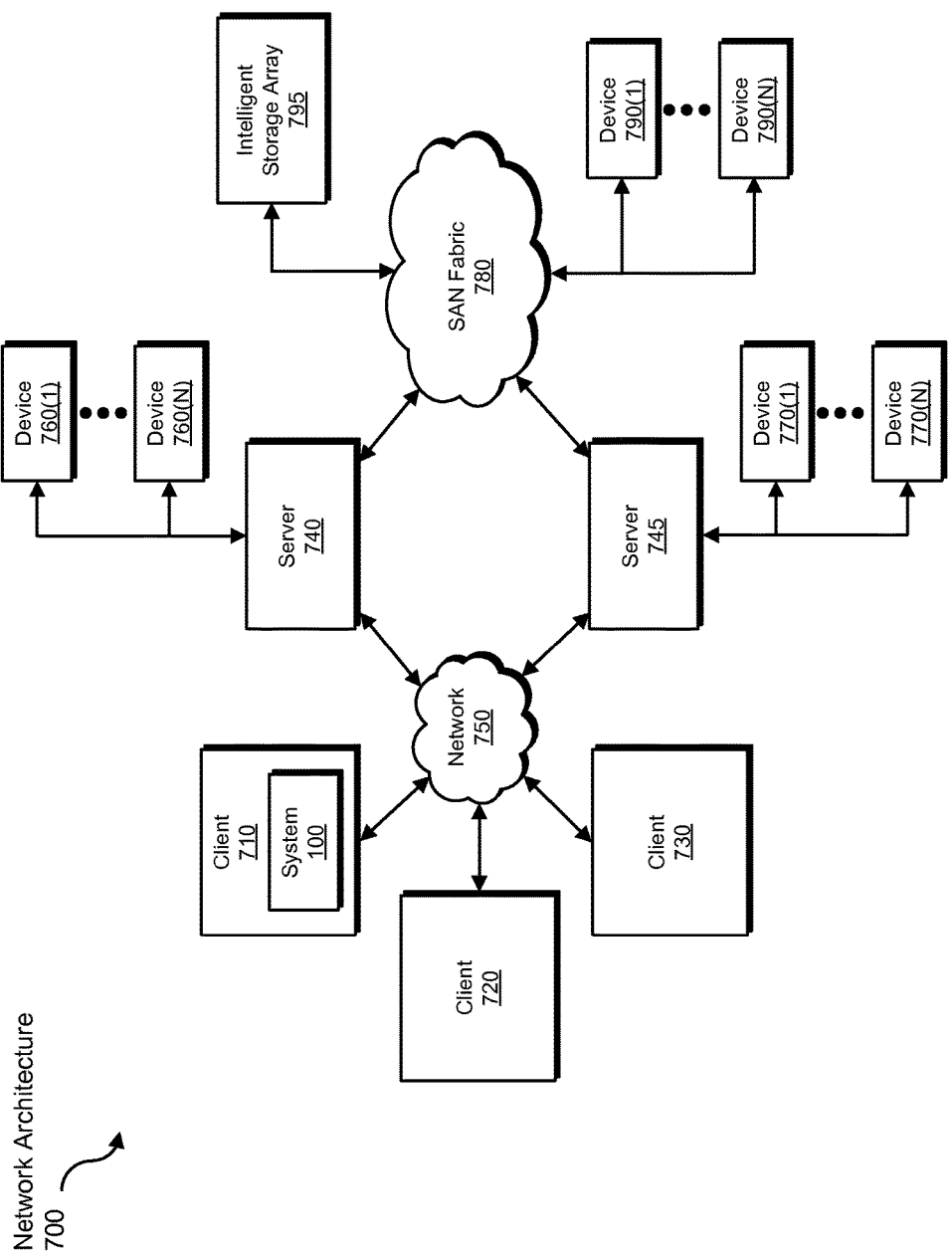
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for data loss prevention of unidentifiable and unsupported object types.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive network, file system, clipboard, and/or application data to be transformed; transform one or more of these items of data and/or the format, structure, and/or state in which the data is stored; output a result of the transformation to memory, storage, and/or an output device; and use the result of the transformation to protect users and organizations from unauthorized loss of sensitive data. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for data loss prevention of unidentifiable and unsupported object types, at least a portion of the method being performed by a computing device comprising at least one processor, the method comprising:

monitoring, through at least one filter, data input to an application during execution;

scanning, through a data loss prevention scanner, the data input to the application to detect whether the data includes sensitive data that is protected by a data loss prevention policy;

flagging, based on the scanning and based on determining that a quantity of sensitive data accessed by the application is greater than a threshold amount that defines a threshold beyond which the application is flagged, the application as having accessed the sensitive data that is protected by the data loss prevention policy;

detecting, after flagging the application, that the application is requesting to output a data object in a format that obscures underlying content such that the data loss prevention scanner is prevented from scanning the data object to determine whether the underlying content includes the sensitive data; and performing, by a data loss prevention program, a remedial action to prevent loss of the sensitive data based on both flagging the application and detecting that the application is requesting to output the data object in the format that obscures underlying content, the remedial action comprising tagging the data object with a tag that designates that the data object was created after the sensitive data was input to the application, wherein:

the format that obscures underlying content comprises an image format; and the image format enables an image to leak sensitive data by displaying text without the text being computer-readable as a string.

2. The method of claim 1, wherein tagging the data object with the tag is performed in response to a user selecting a tag button within a graphical user interface.

3. The method of claim 1, wherein tagging the data object comprises fixing an item of metadata that the data loss prevention scanner is configured to read.

4. The method of claim 3, wherein fixing the item of metadata converts the data object from an unreadable format to a readable format.

5. The method of claim 1, wherein the tag further specifies at least some of the sensitive data that the application accessed.

6. The method of claim 1, further comprising providing an option to a user to remove the sensitive data.

7. The method of claim 6, further comprising permitting the request to output the data object after removal of the sensitive data.

8. The method of claim 1, further comprising allowing the tagged data object to be output to at least one of a file system, a network, and an operating system clipboard.

9. The method of claim 8, further comprising referencing, by an additional filter, the tag to determine that the data object should not be permitted to be transmitted outside of an organization.

10. The method of claim 9, further comprising preventing, by the additional filter, the data object from leaking outside of the organization based on the tag indicating that the data object should not be permitted to be transmitted outside the organization.

11. A system for data loss prevention, the system comprising:

a monitoring module, stored in memory, that monitors, through at least one filter, data input to an application during execution;

a scanning module, stored in memory, that scans, through a data loss prevention scanner, the data input to the application to detect whether the data includes sensitive data that is protected by a data loss prevention policy;

a flagging module, stored in memory, that flags, based on the scanning and based on determining that a quantity of sensitive data accessed by the application is greater than a threshold amount that defines a threshold beyond which the application is flagged, the application as having accessed the sensitive data that is protected by the data loss prevention policy;

a detection module, stored in memory, that detects, after flagging the application, that the application is requesting to output a data object in a format that obscures underlying content such that the data loss prevention scanner is prevented from scanning the data object to determine whether the underlying content includes the sensitive data; and a performance module, stored in memory, that performs, as part of a data loss prevention program, a remedial action to prevent loss of the sensitive data based on both flagging the application and detecting that the application is requesting to output the data object in the format that obscures underlying content, the remedial action comprising tagging the data object with a tag that designates that the data object was created after the sensitive data was input to the application;

at least one physical processor configured to execute the monitoring module, the scanning module, the flagging module, the detection module, and the performance module, wherein:

the format that obscures underlying content comprises an image format; and the image format enables an image to leak sensitive data by displaying text without the text being computer-readable as a string.

12. The system of claim 11, wherein the filter comprises a network filter that filters network packets received by the application during execution.

13. The system of claim 11, wherein the filter comprises a file system filter that filters file access requests from the application to a file system.

14. The system of claim 11, wherein the filter comprises at least one of:

an operating system clipboard filter that filters data pasted into the application during execution; and an application inter-process communication share filter that filters data received into the application from other applications.

15. The system of claim 11, wherein the scanning module scans the data by:

identifying textual content within the data input to the application during execution; and scanning the textual content for at least one of strings and patterns defined as protected by the data loss prevention policy.

16. The system of claim 11, the tag further specifies at least some of the sensitive data that the application accessed.

17. The system of claim 11, wherein the detection module detects that the application is requesting to output the data object in the format that obscures underlying content by detecting that the data object has a file signature that specifies the format.

18. The system of claim 11, wherein the flagging module maintains the application as flagged as having accessed the sensitive data until a process corresponding to the application is terminated.

19. The system of claim 11, wherein the performance module provides an option to a user to remove the sensitive data.

20. A non-transitory computer-readable medium comprising one or more computer-readable instructions that, when executed by at least one processor of a computing device, cause the computing device to:

monitor, through at least one filter, data input to an application during execution;

scan, through a data loss prevention scanner, the data input to the application to detect whether the data includes sensitive data that is protected by a data loss prevention policy;

flag, based on the scanning and based on determining that a quantity of sensitive data accessed by the application is greater than a threshold amount that defines a threshold beyond which the application is flagged, the application as having accessed the sensitive data that is protected by the data loss prevention policy;

detect, after flagging the application, that the application is requesting to output a data object in a format that obscures underlying content such that the data loss prevention scanner is prevented from scanning the data object to determine whether the underlying content includes the sensitive data;

perform, by a data loss prevention program, a remedial action to prevent loss of the sensitive data based on both flagging the application and detecting that the application is requesting to output the data object in the format that obscures underlying content, the remedial action comprising tagging the data object with a tag that designates that the data object was created after the sensitive data was input to the application, wherein:

the format that obscures underlying content comprises an image format; and the image format enables an image to leak sensitive data by displaying text without the text being computer-readable as a string.

* * * * *